United States Patent [19]

Maisch

[11] Patent Number: 5,493,977
[45] Date of Patent: Feb. 27, 1996

[54] SEED PLANTER

[76] Inventor: Mark A. Maisch, 8901 Lowell, Overland Park, Kans. 66212

[21] Appl. No.: 194,035

[22] Filed: Feb. 9, 1994

[51] Int. Cl.⁶ .................................................. A01C 5/02
[52] U.S. Cl. ............................................ 111/92; 111/90
[58] Field of Search ............................... 111/92, 89, 90, 111/94–97, 106, 7.1; 222/175, 608, 163, 564

[56] References Cited

U.S. PATENT DOCUMENTS

| | | |
|---|---|---|
| 1,287,516 | 12/1918 | Theobald . |
| 1,439,601 | 12/1922 | Boop ........................................ 111/92 |
| 1,994,196 | 3/1935 | McDonough . |
| 2,324,445 | 7/1943 | Waterman ................................ 256/54 |
| 2,325,939 | 8/1943 | Buehler .................................... 111/96 |
| 2,737,318 | 3/1956 | Molinaire ................................. 111/96 |
| 2,860,586 | 11/1958 | Nozell ...................................... 111/92 |
| 2,865,315 | 12/1958 | Goldstein . |
| 3,170,422 | 2/1965 | Gregory . |
| 3,202,120 | 8/1965 | Laffler . |
| 3,517,629 | 6/1970 | Bridges et al. . |
| 3,771,474 | 11/1973 | Elston . |
| 3,815,526 | 6/1974 | Christopherson . |
| 3,903,815 | 9/1975 | Winkler .................................... 111/92 |
| 4,114,543 | 9/1978 | Mitchell . |
| 4,120,432 | 10/1978 | Fuchs ....................................... 222/565 |
| 4,218,981 | 8/1980 | Kelly . |
| 4,246,854 | 11/1981 | Lempa, Jr. . |
| 4,614,160 | 9/1986 | Curlett . |
| 4,800,827 | 1/1989 | Smith ....................................... 111/97 |
| 4,843,982 | 7/1989 | Nagy-Szakaly . |

FOREIGN PATENT DOCUMENTS

| | | |
|---|---|---|
| 1013583 | 7/1952 | France . |
| 407315 | 9/1944 | Italy . |
| 587245 | 3/1958 | Italy ......................................... 111/96 |

*Primary Examiner*—Terry Lee Melius
*Assistant Examiner*—Spencer K. Warnick, IV
*Attorney, Agent, or Firm*—Litman, McMahon and Brown

[57] ABSTRACT

A planter for seeds and bulbs includes a tube assembly receiving a plunger which is reciprocable between retracted and extended positions. With the plunger in its extended position, a lower end thereof extends downwardly from the tube assembly for embedding a seed in the ground. A handle is mounted on an upper end of the plunger for operating the planter. A feed assembly includes a seed hopper mounted on an upper end of a conduit, the lower end of which is connected to a lower end of the tube for passing seeds thereinto. A spacing rod is provided for gauging the spacing between plantings.

13 Claims, 2 Drawing Sheets

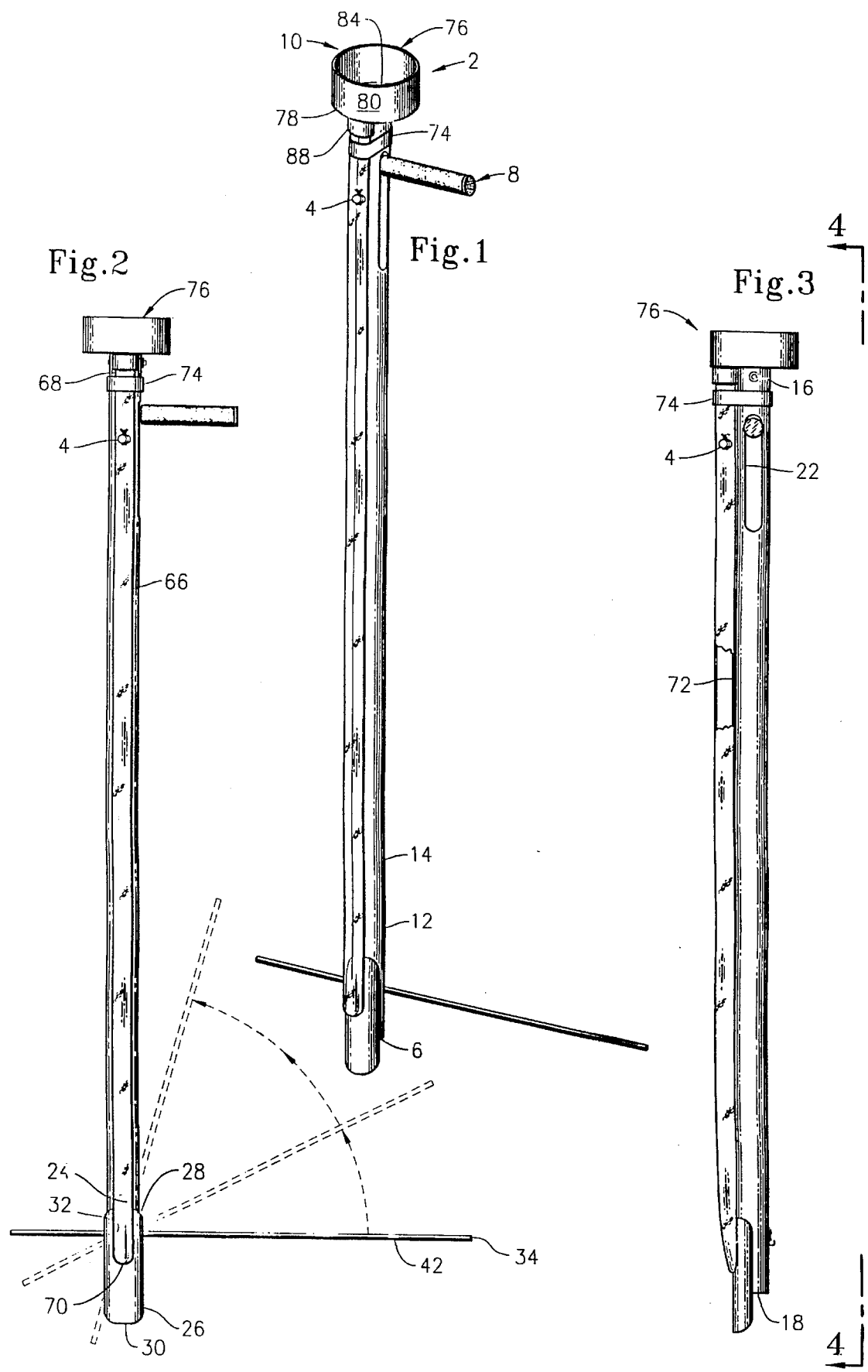

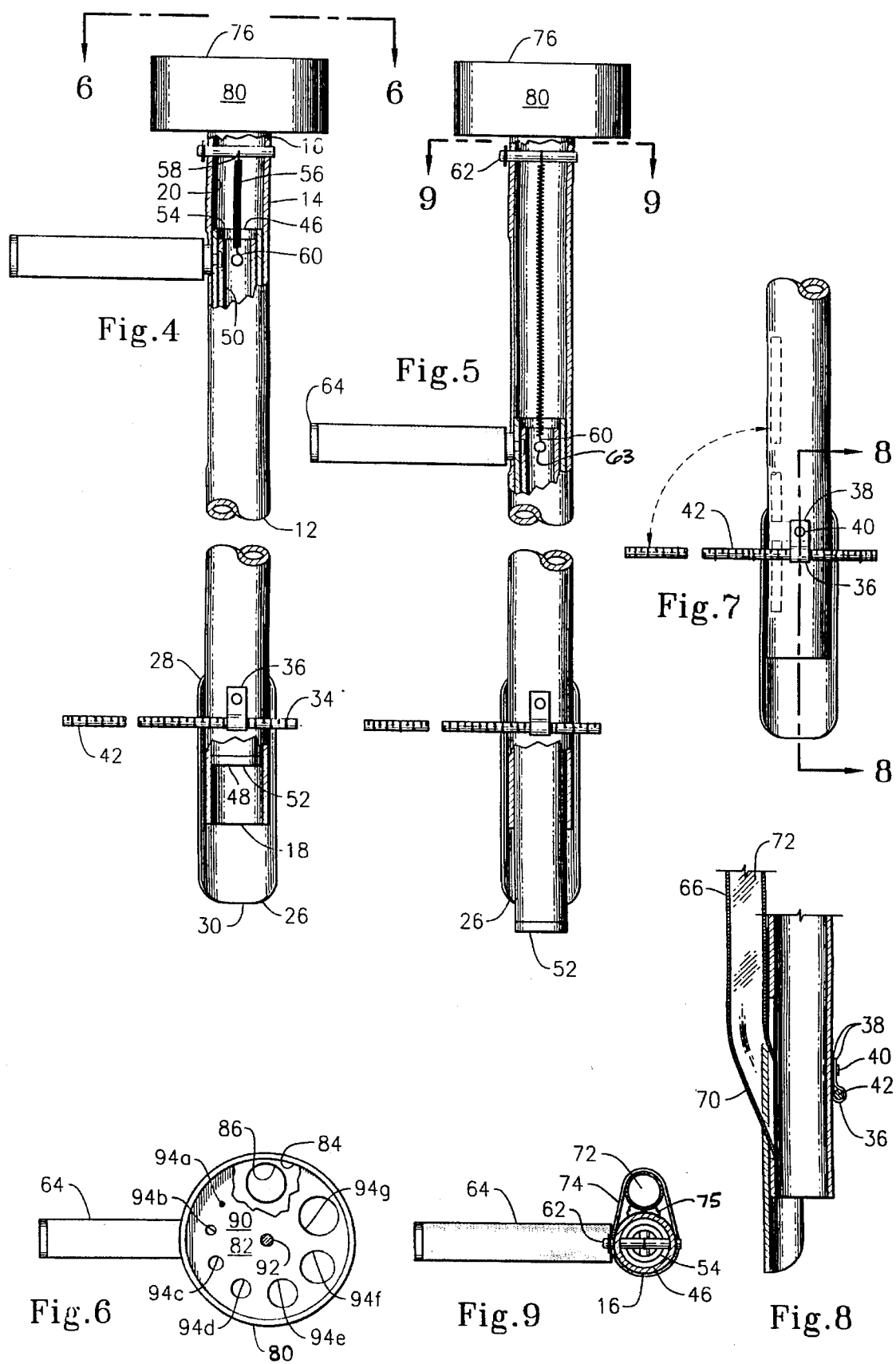

SEED PLANTER

BACKGROUND OF THE INVENTION

1. Field of the Invention

The present invention relates generally to planters, and in particular to a manual seed planter for embedding seeds by an operator in an upright, standing position.

2. Description of the Related Art

Various planters have heretofore been devised for accurately and reliably embedding seeds in cultivated ground. Mechanized planters are well known and generally tend to be relatively complicated and expensive. Such mechanized planters are typically employed by commercial agricultural operations and are often used for planting large areas of cultivated ground on farms which can comprise many acres.

However, many people who maintain small gardens and plots plant relatively small numbers of seeds and thus do not require mechanized, high volume equipment. Many such gardens are planted by hand, i.e., with a spade and the gardener working in a kneeling position. Such work tends to be laborious, time-consuming and uncomfortable. Gardeners who plant by hand may thus find themselves constrained by the limitations of their equipment and time available for planting.

Hand planters have heretofore been devised for addressing such needs. For example, the Theobald U.S. Pat. No. 1,287,516 discloses a hand planter with an operating handle and a seed hopper.

The McDonough U.S. Pat. No. 1,994,196 discloses a seed planter with a hopper mounted on top and an operable gate at its lower end. The Goldstein U.S. Pat. No. 2,865,315 discloses a hand bulb planter with a spacing measuring device.

However, heretofore there has not been available a planter with the advantages and features of the present invention.

SUMMARY OF THE INVENTION

In the practice of the present invention, a planter is provided which includes a tube assembly having a tube with upper and lower ends and a tube bore extending therebetween, A plunger assembly is positioned within the tube bore and is reciprocable therein between a retracted position and an extended position with a plunger lower end extending from the tube lower end. The plunger assembly can be reciprocated by an operator in an upright, standing position by grasping and reciprocating a handle attached to the plunger assembly. A feed assembly includes a hopper mounted near the tube upper end and communicates with a conduit extending alongside the tube and forming a juncture therewith at the conduit and tube lower ends. Seeds can be dropped into the conduit through the hopper and into the tube bore at the tube lower end, where they are located under the plunger lower end and can be embedded into the soil by the plunger on an extend stroke thereof.

OBJECTS AND ADVANTAGES OF THE INVENTION

The principal objects and advantages of the present invention include: providing a manual seed planter; providing such a planter which can be operated in an upright, standing position; providing such a planter which is adapted for positively inserting seeds and bulbs; providing such a planter which is adaptable for use with seeds and bulbs of various sizes; providing such a planter which is adapted for uniformly spacing seed and bulb planting locations; providing such a planter which is economical to manufacture, efficient in operation and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an upper, front, right side perspective view of a planter embodying the present invention.

FIG. 2 is a front elevational view thereof.

FIG. 3 is a right side elevational view thereof.

FIG. 4 is an enlarged, fragmentary, rear elevational view thereof with a plunger assembly thereof shown in its retracted position.

FIG. 5 is an enlarged, fragmentary, rear elevational view thereof with the plunger assembly shown in its extended position.

FIG. 6 is a top plan view thereof, taken generally along line 6—6 in FIG. 4.

FIG. 7 is an enlarged, fragmentary, rear elevational view thereof.

FIG. 8 is an enlarged, fragmentary, cross-sectional view thereof, taken generally along line 8—8 in 7.

FIG. 9 is a horizontal cross-sectional view thereof, taken generally along line 9—9 in FIG. 5.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

The reference numeral 2 generally designates a planter for seeds 4, which will be understood to refer to various objects to be planted, including bulbs.

The planter 2 generally comprises a tube assembly 6, a plunger assembly 8 and a feed assembly 10.

II. Tube Assembly 6

The tube assembly 6 includes a tube 12 with a tube wall 14, an upper end 16, a lower end 18 and a tube bore 20 extending between and open at said ends.

The tube 12 includes an upper elongated slot 22 located in proximity to its upper end 16 and a lower elongated slot 24 located in proximity to its lower end 18, which slots 16, 18 are formed in the tube wall 14.

The tube 12 can comprise any suitable material, including plastic and metal. Without limitation on the generality of useful materials, polyvinyl chloride (PVC) plastic is suitable for the tube 12 and has the advantageous property of being resistant to rust and corrosion.

A blade 26 has the general configuration of a hollow half-cylinder adapted to mate with the tube wall 14, to which it can be adhesively (e.g., solvent-welded) or otherwise attached. The blade 26 includes an upper end 28 and a lower end 30, the latter extending downwardly from the tube lower end 18 and being adapted for sharpening, if desired. A blade slot 32 is formed in the blade 26 and is open at its upper end 16. The blade slot 32 is generally aligned with the tube lower slot 24.

A spacing subassembly 34 includes a mounting strap 36 folded double with opposite ends 38 thereof positioned in overlying relationship and secured to the tube wall 14 by a spacing subassembly pivot pin 40 which can comprise, for example, a rivet (FIG. 8).

A spacing rod 42 is slidably secured within the mounting strap 36 and is pivotable therewith between a storage position generally alongside the tube 12 (phantom lines in FIG. 7) and a use position extending generally transversely from the tube 12, i.e., generally parallel to a ground surface being planted.

The spacing rod 42 can include graduated markings for identifying various distances it projects from the tube assembly 6, which can be varied according to a desired spacing of the seeds 4 being planted.

III. Plunger Assembly 8

The plunger assembly 8 includes a plunger 44 with upper and lower ends 46, 48 and a plunger bore 50 extending therebetween and receiving a plug 52 at the plunger lower end 48 for closing same.

The plunger upper end 46 is open and receives an insert 54 which is fastened within the plunger bore 50, e.g., by solvent-welding. A return spring 56 includes an upper end 58 mounted on an upper return spring pin 62 which extends through the tube wall and bore 14, 20 in proximity to the tube upper end 16. A return spring lower end 60 is fastened to the tube insert 54 by a lower return spring pin 63.

A plunger handle 64 is mounted on the plunger 44 in proximity to its upper end 46 and projects laterally therefrom and is slidably received within the tube upper slot 22.

IV. Feed Assembly 10

The feed assembly 10 Includes a conduit 66 with upper and lower ends 68, 70, a passage 72 extending therebetween and open thereat, and is mounted on the tube 12 by suitable brackets 74 and/or adhesive 75.

A hopper subassembly 76 is mounted on the conduit upper end 68 and includes a generally cylindrical hopper 78 with a hopper sidewall 80 and a bottom 82 forming an upwardly-open receptacle 84. A hopper discharge opening 86 is formed in the hopper bottom 82 and communicates with an outlet 88 connected to the conduit upper end 68 in communication with the passage 72.

A hopper selection plate 90 is generally circular in configuration and is rotatably mounted on the hopper bottom 82 within the receptacle 84 by a selection plate pivot pin 92. The selection plate 90 includes multiple orifices 94a– 94g which are circumferentially spaced and have different diameters for passing seeds of various sizes. The selection plate 90 can be rotated to selectively align its orifices 94a–94g with the discharge opening 86.

The conduit lower end 70 is received in the aligned tube lower slot 24 and blade slot 32.

V. Operation

In operation, rows of seeds can be relatively quickly planted by a person in an upright working position. Seeds 4 or bulbs can be placed in the hopper receptacle 84 and dropped individually through an appropriate orifice 94a–94g with the plunger 44 in its retracted (upper) position. The seed 4 falls through the conduit passage 72 and enters the tube bore 20 in proximity to the tube lower end 18 and falls to the ground. The conduit 66 can be clear to observe the passage of the seed 4.

The plunger 44 is then lowered from its retracted position by means of the handle 64 through an extend stroke to its extended position whereby the plunger lower end 48 embeds the seed 4. If desired, soil can be kicked over the embedded seed 4, or the blade 26 can be used for placing a small amount of soil thereover.

The spacing subassembly can be used to evenly space the planting sites, and is adjustable to accommodate desired spacings between different plant species.

It is to be understood that while certain forms of the present invention have been illustrated and described herein, it is not to be limited to the specific forms or arrangement of parts described and shown.

What is claimed and desired to be secured by Letters Patent is as follows:

1. A planter for seeds and bulbs, which comprises:

(a) a tube with upper and lower ends and a bore extending between and open at said ends;

(b) a plunger having upper and lower ends and being reciprocably mounted within said tube bore for movement between a retracted position with said plunger lower end retracted within said bore and an extended position with said plunger lower end telescopically extending from said tube lower end, said plunger having a plunger extend stroke and a plunger bore;

(c) handle means mounted on said plunger;

(d) conduit means having upper and lower ends and a passage extending therebetween;

(e) junction means joining said tube and conduit means lower ends with said tube bore and conduit means passage in communication;

(f) said plunger lower end substantially filling said tube bore at said tube lower end whereby a seed located in said tube lower end is embedded by said plunger extend stroke;

(g) spring means connected to said plunger and to said tube for biasing said plunger to its retracted position; and (h) spring mounting means in said plunger bore for mounting said spring to said plunger.

2. The planter according to claim 1 wherein:
(a) said tube includes an upper elongated slot in proximity to the upper end thereof; and
(b) said plunger means includes a handle projecting laterally from said plunger means and slidably received in said upper tube slot.

3. The planter according to claim 1 wherein:
(a) said junction means includes a lower elongated slot in said tube receiving the conduit means lower end in proximity to the tube lower end.

4. The planter according to claim 1, which includes:
(a) a blade having the general configuration of a half hollow cylinder with upper and lower ends, said blade being mounted on said tube with the blade upper end positioned above said tube lower end and the blade lower end protruding downwardly below said tube lower end.

5. The planter according to claim 4, which includes:
(a) a slot in said blade receiving said conduit lower end generally in alignment with said lower elongated slot in said tube.

6. The hopper according to claim 1, which includes:
(a) spacing means mounted on said tube in proximity to the lower end thereof and including an adjustable rod adapted for spacing a plurality of seeds being planted at predetermined intervals.

7. The planter according to claim 1, which includes:
(a) a seed hopper mounted on said conduit upper end.

8. The planter according to claim 7 wherein:
(a) said hopper includes a sidewall and a circular bottom forming an upwardly-open receptacle.

9. The planter according to claim 8 wherein:
(a) said hopper includes a discharge opening in said hopper bottom and an outlet depending downwardly from said hopper bottom and communicating with said discharge opening, said outlet being connected to said conduit upper end in communication therewith.

10. The planter according to claim 9 wherein:
(a) said hopper includes a circular selection plate having a center and a plurality of orifices of varying diameters circumferentially spaced around the selection plate center, and a pivot pin extending through said selection plate center and said hopper bottom for pivotally mounting said selection plate on said hopper bottom.

11. The planter according to claim 1, which includes:
(a) a spacer subassembly including a strap with opposite ends attached to said tube in proximity to the lower end thereof and a rod slidably received within said strap, said strap and said rod being pivotable between a stored position with said rod alongside said tube and a use position extending transversely therefrom.

12. A planter for seeds and bulbs, which comprises:
(a) a tube including upper and lower ends, a bore extending between said ends and open thereat, and a tube wall enclosing said bore;
(b) a plunger assembly including:
  (1) a cylindrical plunger with an open, upper end and a closed, lower end, said plunger being positioned within said tube bore and movable between a retracted and an extended position;
  (2) said plunger having a plunger bore;
  (3) plug means closing said plunger lower end;
  (4) a plunger insert positioned within said plunger bore in proximity to said plunger upper end;
  (5) a handle mounted on said plunger in proximity to the upper end thereof and projecting laterally therefrom;
  (6) a helical return spring having a lower end connected to said plunger insert and an upper end; and
  (7) a return spring retainer pin extending through said tube wall and transversely through said tube bore in proximity to said tube upper end, said return spring upper end being connected to said return spring retainer pin;
(c) a conduit having upper and lower ends and a passage extending therebetween and open at said conduit upper and lower ends;
(d) a conduit mounting bracket mounted on and interconnecting said tube and conduit upper ends;
(e) a hopper including:
  (1) a sidewall;
  (2) a bottom forming a receptacle with said sidewall, said bottom having a discharge opening and a center;
  (3) a tubular outlet pending downwardly from said hopper bottom and communicating with said hopper bottom discharge opening, said tubular outlet being connected to said conduit upper end in communication with said conduit passage;
  (4) a circular selection plate including a center and a plurality of circumferentially-spaced circular orifices each having a different diameter, each said orifice being selectively alignable with said hopper bottom discharge opening;
  (5) a selection plate axle rotatably connecting said selection plate and said hopper bottom at the centers thereof;
  (6) tube/conduit junction means comprising a slot formed in said tube wall in proximity to the lower end thereof and receiving said conduit lower end;
(f) a blade having the general configuration of a hollow half-cylinder with upper and lower ends, said blade having a slot open at said blade upper end, said blade being mounted on said tube wall with said blade slot generally in alignment with said tube wall slot and with said blade lower end projecting downwardly from said tube lower end; and
(g) a spacer subassembly including:
  (1) a strap with opposite ends, said strap being folded with said strap opposite ends overlying each other;
  (2) a spacer subassembly mounting rivet extending through said strap ends and said tube wall;
  (3) a measuring rod slidably adjustably received within said strap and connected thereby to said tube; and
  (4) said spacer subassembly being rotatable about said spacer mounting rivet between a stored position generally juxtaposed with respect to said tube and a spacing position extending generally transversely from said tube.

13. A planter for seeds, which comprises:
(a) a tube with upper and lower ends and a bore extending between and open at said ends;
(b) a plunger having upper and lower ends and being reciprocably mounted within said tube bore for movement between a retracted position with said plunger lower end retracted within said bore and an extended position with said plunger lower end telescopically extending from said tube lower end, said plunger having a plunger extend stroke;
(c) handle means mounted on said plunger;
(d) conduit means having upper and lower ends and a passage extending therebetween;

(e) junction means joining said tube and conduit means lower ends with said tube bore and conduit means passage in communication;

(f) said plunger lower end substantially filling said tube bore at said tube lower end whereby a seed located in said tube lower end is embedded by said plunger extend stroke; and (g) said tube bore having a tube bore cross-sectional dimension;

(h) said plunger lower end having a plunger lower end cross-sectional dimension slightly less than said tube bore cross-sectional dimension whereby said plunger lower end is slidingly guided by said tube bore (i) a plunger return spring having an upper end connected to said tube in proximity to the upper end thereof and a lower end connected to said plunger in proximity to the upper end thereof;

(j) an upper spring retainer pin extending transversely across said tube bore, said return spring upper end being connected thereto;

(k) an insert positioned in said plunger in proximity to the upper end thereof; and (l) a lower spring retainer pin extending transversely across said insert and connected to said return spring lower end.

* * * * *